J. M. WHITE.
VEHICLE BRAKE.
APPLICATION FILED APR. 8, 1914.
1,124,084.
Patented Jan. 5, 1915.
2 SHEETS—SHEET 2.
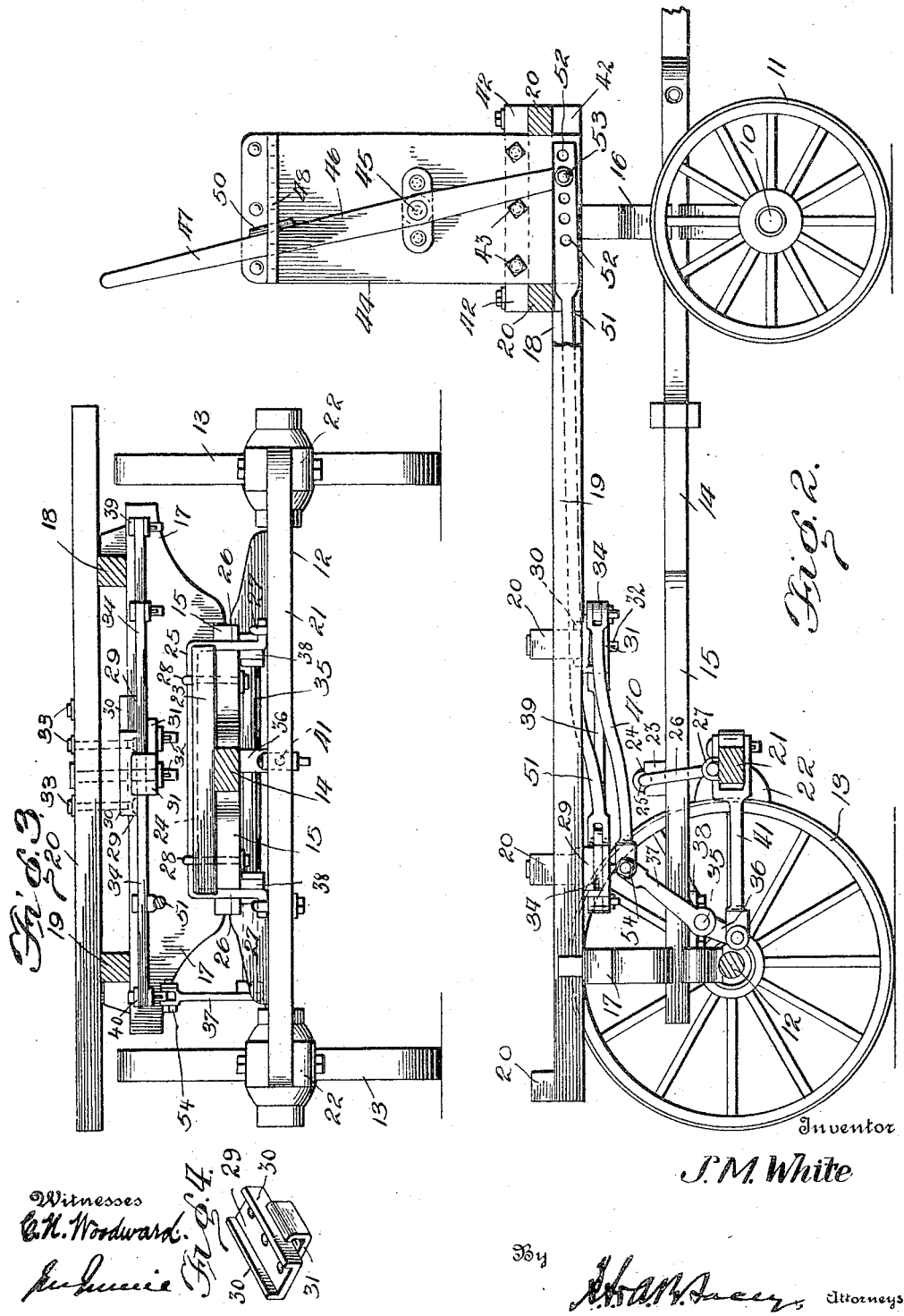
Inventor
J. M. White
Witnesses
C. H. Woodward
By
Attorneys.

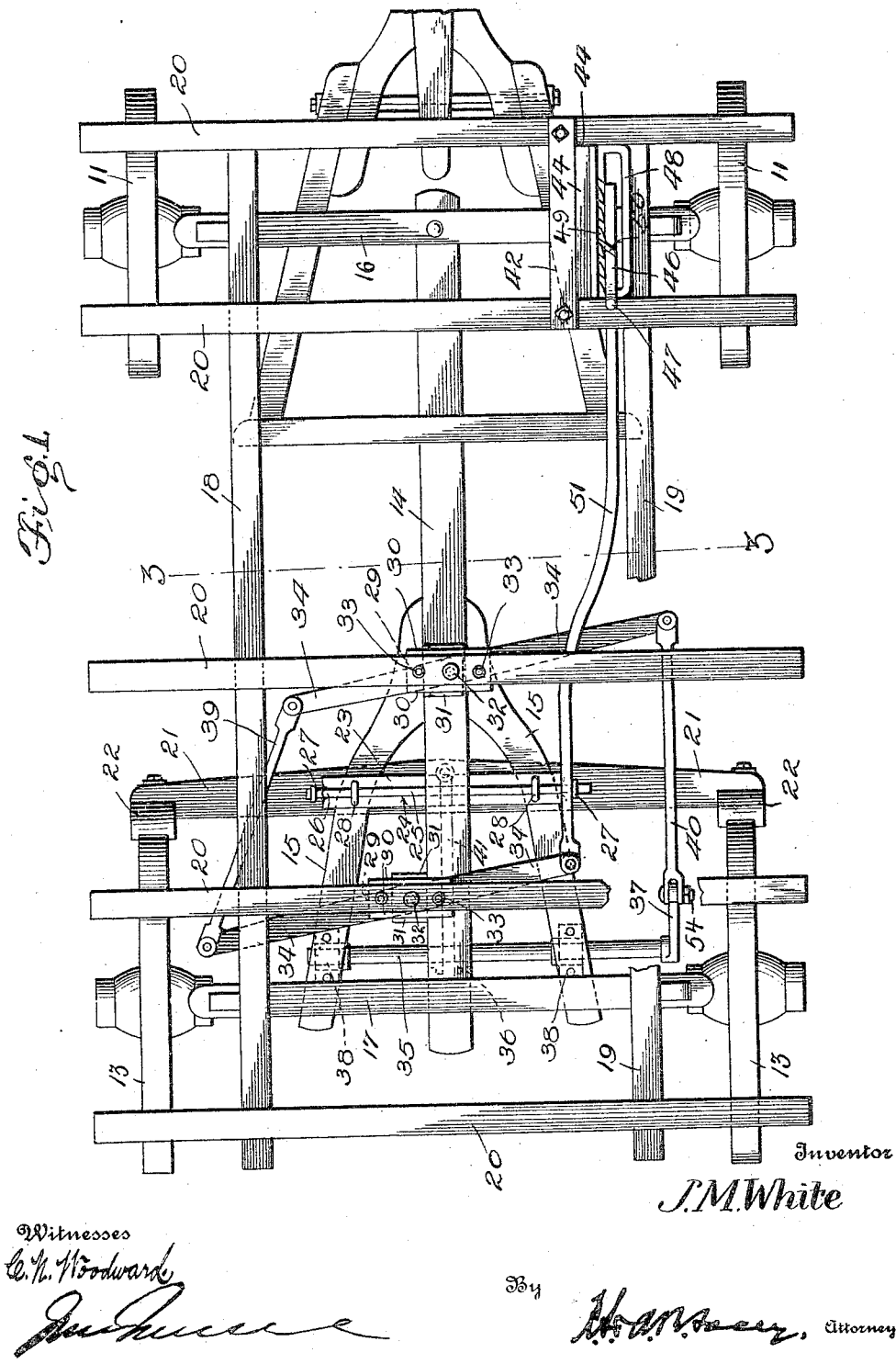

UNITED STATES PATENT OFFICE.

JAMES M. WHITE, OF BLOUNTVILLE, TENNESSEE.

VEHICLE-BRAKE.

1,124,084. Specification of Letters Patent. Patented Jan. 5, 1915.

Application filed April 8, 1914. Serial No. 830,489.

*To all whom it may concern:*

Be it known that I, JAMES M. WHITE, citizen of the United States, residing at Blountville, in the county of Sullivan and State of Tennessee, have invented certain new and useful Improvements in Vehicle-Brakes, of which the following is a specification.

This invention relates to improvements in brake operating mechanism, more particularly to the class of brakes which are applicable to hay racks and like vehicles, and has for one of its objects to improve the construction and increase the efficiency and utility of devices of this character.

Another object of the invention is to provide a simply constructed device partly attached to the body of the vehicle and partly attached to the running gear of the vehicle and separable by detaching a single bolt, so that the body may be readily and quickly detached from the running gear.

Another object of the invention is to provide a simply constructed device in which the operating mechanism is located beneath the body and does not interfere with the load carried thereby.

Another object of the invention is to provide a simply constructed device in which an increased leverage action is produced without increasing the throw of the operating lever.

With these and other objects in view the invention consists in certain novel features of construction as hereinafter shown and described and then specifically pointed out in the claims; and in the drawings illustrative of the preferred embodiment of the invention Figure 1 is a plan view of a conventional hay carrying vehicle including the running gear and the rack with the improved brake mechanism applied. Fig. 2 is a side elevation of the parts shown in Fig. 1 partly in section. Fig. 3 is a transverse section on the line 3—3 of Fig. 1. Fig. 4 is a perspective view of one of the lever supports or brackets.

Corresponding and like parts are referred to in the following description and indicated in all the views of the drawings by the same reference characters.

The improved device may be applied without material structural change to vehicles of various forms and it is not desired therefore to limit the invention in any manner in this respect, but for the purpose of illustration the device is shown applied to a conventional hay rack and the running gear of the same, the forward axle being represented at 10, the forward wheels at 11, the rear axle at 12, the rear wheels at 13, the reach member at 14, and the rear hounds at 15. The bolster for the forward axle is represented at 16 and the rear bolster at 17.

The rack portion of the vehicle comprises side rail or sill members 18—19 and transverse sill members 20 these parts being of the usual construction.

The brake beam is represented conventionally at 21 and carrying the shoes 22 for engagement with the rear wheels 13. Extending over the rear hounds 15 is a supporting member 23, preferably notched where the hound members are engaged thereby and provided with a longitudinally directed channel 24 in its upper face. Mounted to swing in the channel 24 is a rod 25 having down-turned terminals 26 to engage U bolts 27 in the brake beam 21 and thus suspend the brake beam in swinging relations to the member 23. The supporting member 23 is provided with U bolts 28 to extend through the members of the rear hound, and likewise extend over the rod 25, and thus perform the two-fold function of a coupling means between the rod and the supporting member and likewise to couple the supporting member to the hounds. By this simple means the brake beam 21 is firmly supported in position while free to swing beneath the hounds.

Bearing beneath a contiguous pair of the transverse sill members 20 are a pair of bracket devices to support portions of the brake mechanism, and as these bracket devices are precisely alike the description of one will suffice for both. Each bracket device comprises a body portion 29 and bearing beneath the members 20 and with guard ribs 30 spaced apart at their side edges to bear against the sides of the members 20 and thus support and reinforce the connection between the members 29 and 20. Each of the members 29 is provided with a depending keeper 31 through which and the central portion of the body 29 a bolt aperture is formed to receive a bolt 32, the latter thus forming the pivot member of the bracket device. The member 29 is further secured to the members 20 by additional bolts 33 near their ends.

Extending through each of the keepers 31 are lever arms 34 which are pivoted intermediate their ends respectively to the bolts 32, the keepers 31 being of sufficient width to permit a certain degree of lateral swinging movement to the lever arms 34. The pivots 32 of the levers 34 are nearer one end of the levers than the other, with the rod 39 connecting the shorter end of the forward lever 34 to the rear lever 34, while the pull rod 51 is connected to the shorter end of the rear lever 34. By this means a relatively short movement only of the operating lever 46 is necessary to effect a relatively long movement of the brake applying mechanism. This arrangement is a great advantage when applied to hay racks and like vehicles as a relatively restricted movement of the operating lever only is necessary to accomplish the desired results.

Mounted for oscillation beneath the rear hounds 15, and preferably near the rear axle, is a rock shaft 35 having a downwardly directed intermediate arm 36 and an upwardly directed terminal arm 37. The rock shaft 35 is supported beneath the hounds by suitable bearings 38 as shown. A rod 39 connects the members 34 at one end, while a rod 40 connects the opposite end of the forward member 34 to the upper end of the arm 37. A rod 41 connects the lower end of the arm 36 to the center of the brake beam 21 as shown.

One pair of the transverse sill members 20 is located relatively near together at the forward end of the rack, and coupled across these forward transverse sill members are bars 42. Located above and below the sill members and bolted or otherwise secured at 43 to these bars is a vertical standard member 44.

Pivoted at 45 to the standard 44 is an operating lever arm 46 which extends at its lower end slightly below the lower line of the transverse sill members 20, and is extended at its upper end into a handle 47. The lever arm 46 extends between its pivot 45 and the handle 47 through a loop device 48 having a plurality of ratchet teeth 49 with which an obliquely directed reduced portion 50 of the lever arm 47 engages, to hold the latter at any desired point of adjustment. A pull member 51 is connected at its terminals to the lower end of the lever arm 46 and to the opposite end of the rear member 34 as shown. The forward end of the member 51 is forked to engage upon opposite sides of the member 46 and is provided with a plurality of apertures 52 to receive a pivot pin 53, to enable the member 51 to be adjustably coupled to the member 46. The standard 44 is located convenient to the seat of the driver upon the rack, or from his position upon the load, so that the presence of the load does not interfere with the convenient operation of the brake lever. By this simple arrangement it will be obvious, that the brake may be quickly applied by the driver from his location upon the rack, and without interference from the load.

The improved device is simple in construction, can be inexpensively manufactured and applied, and is strong and durable.

It will be noted that all of the parts except the standard 44 and its attachments are located beneath the body, and do not interfere with the load. It will also be noted that the bracket members 29 and their attached levers 34 together with the rods 39—40—51 lie relatively close against the under face of the rack, while the rock shaft 35 together with its arms 36—37 and the brake beam and its suspending means together with the connecting rod 41, are connected wholly to the rear hounds of the vehicle. The portions of the device which are associated with the body are connected to the portions of the device which are associated with the running gear by one bolt or pin only, namely, the pin 54 by which the rod 40 is connected to the arm 37, hence by removing this single pin 54 the body supported portion of the apparatus is entirely freed from the running gear supported portion of the apparatus, so that when the rack is to be removed it is only necessary to detach the one single bolt 54 to enable the rack to be elevated free from the running gear. This is an important feature of applicant's device and adds materially to its efficiency and utility.

The parts may be of any suitable material, partly of wood and partly of metal, or substantially wholly of metal.

Having thus described the invention, what is claimed as new is:

In a vehicle brake device, members spaced apart and adapted to engage a vehicle body, a bracket depending from each of said members, a pivot member extending through each of the brackets and through each of the spaced body members, a lever extending through each of said brackets and engaging said pivot member nearer one end than the other, connecting means between the shorter end of one of said levers and the longer end of the other lever, a brake applying mechanism, connecting means between the long end of one of said levers and the brake applying means, and a pull device connected to the longer end of the other of said levers.

In testimony whereof I affix my signature in presence of two witnesses.

JAMES M. WHITE. [L. S.]

Witnesses:
 E. D. PEARSON,
 JAMES W. WOLFE.

Copies of this patent may be obtained for five cents each, by addressing the "Commissioner of Patents, Washington, D. C."